US012573980B1

(12) United States Patent
Mayer et al.

(10) Patent No.: US 12,573,980 B1
(45) Date of Patent: Mar. 10, 2026

(54) FLOATING TORQUE TUBE TRACKER ASSEMBLY

(71) Applicant: NORIA ENERGY HOLDINGS, LLC, Sausalito, CA (US)

(72) Inventors: Alex Mayer, Mill Valley, CA (US); James Raiford, San Francisco, CA (US); Jason King, San Francisco, CA (US); Becca Suchower, Sausalito, CA (US)

(73) Assignee: NORIA ENERGY HOLDINGS, LLC, Sausalito, CA (US)

( * ) Notice: Subject to any disclaimer, the term of this patent is extended or adjusted under 35 U.S.C. 154(b) by 0 days.

(21) Appl. No.: 18/940,342

(22) Filed: Nov. 7, 2024

(51) Int. Cl.
*H02S 20/32* (2014.01)
*B63B 35/44* (2006.01)
(52) U.S. Cl.
CPC .............. *H02S 20/32* (2014.12); *B63B 35/44* (2013.01); *B63B 2035/4453* (2013.01)

(58) Field of Classification Search
CPC ... H02S 20/32; F24S 20/70; B63B 2035/4453
See application file for complete search history.

(56) References Cited

U.S. PATENT DOCUMENTS

2018/0119994 A1* 5/2018 Helming ................. F24S 20/70
2021/0197934 A1* 7/2021 An .......................... B63B 35/38

FOREIGN PATENT DOCUMENTS

EP 3925069 * 5/2024

* cited by examiner

*Primary Examiner* — Jayne L Mershon
(74) *Attorney, Agent, or Firm* — David R. Heckadon; Gordon Rees Scully Mansukhani LLP

(57) ABSTRACT

A floating solar photovoltaic array torque tube tracker assembly, including: a plurality of floats; solar PV modules mounted on top of the plurality of floats; and a rotation control system for rotating the floats or torque tubes passing through the floats to tilt the solar PV modules in a direction to track movement of the sun.

13 Claims, 21 Drawing Sheets

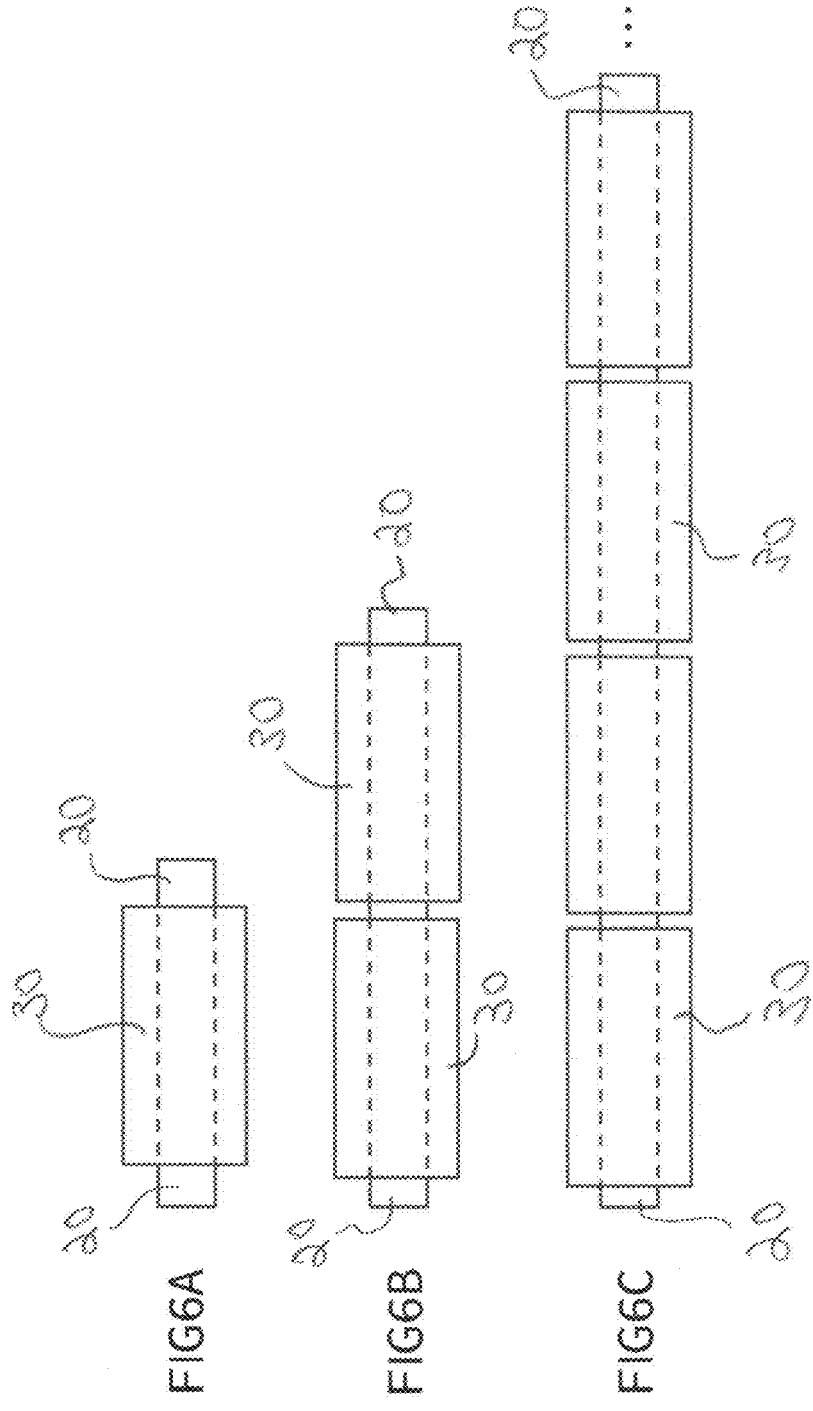

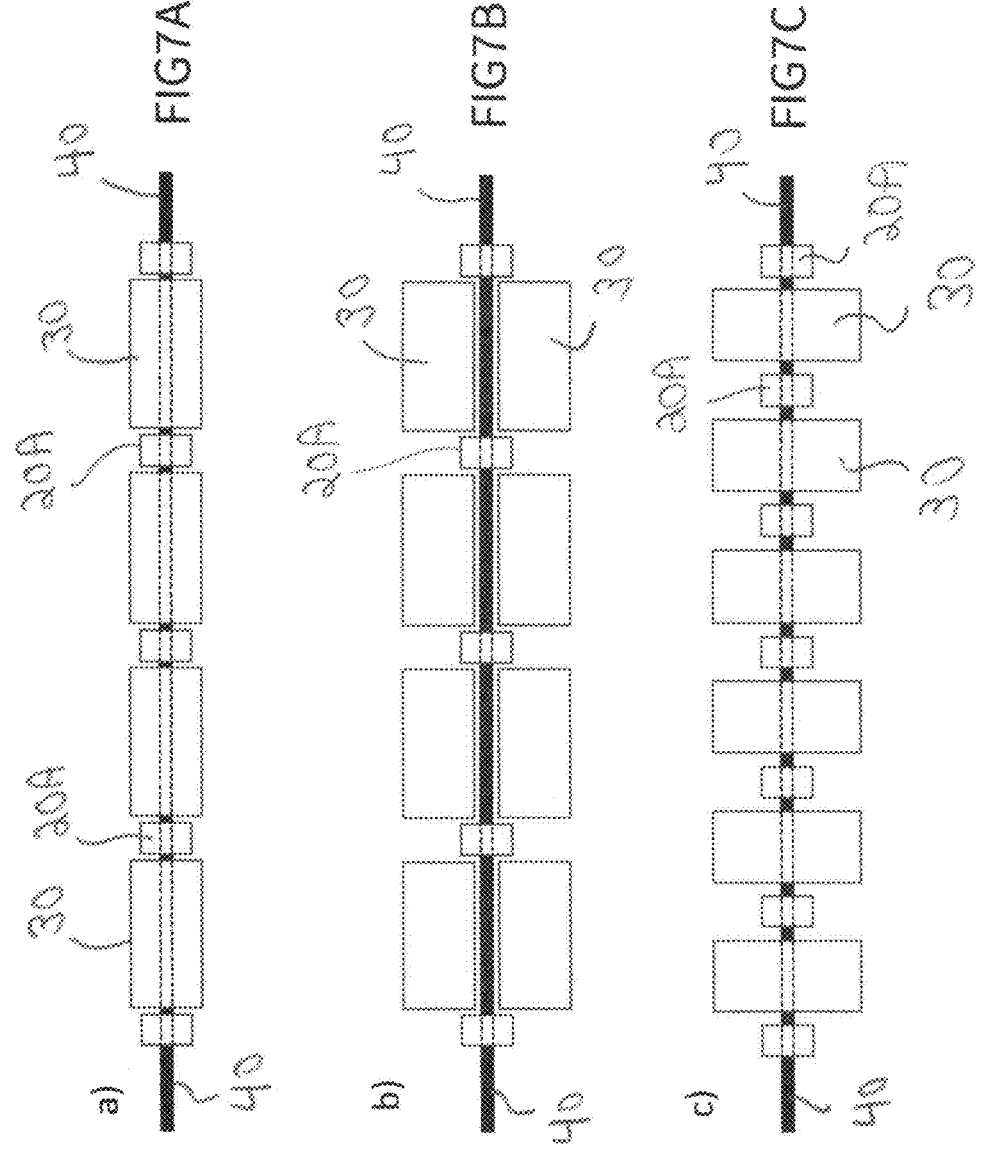

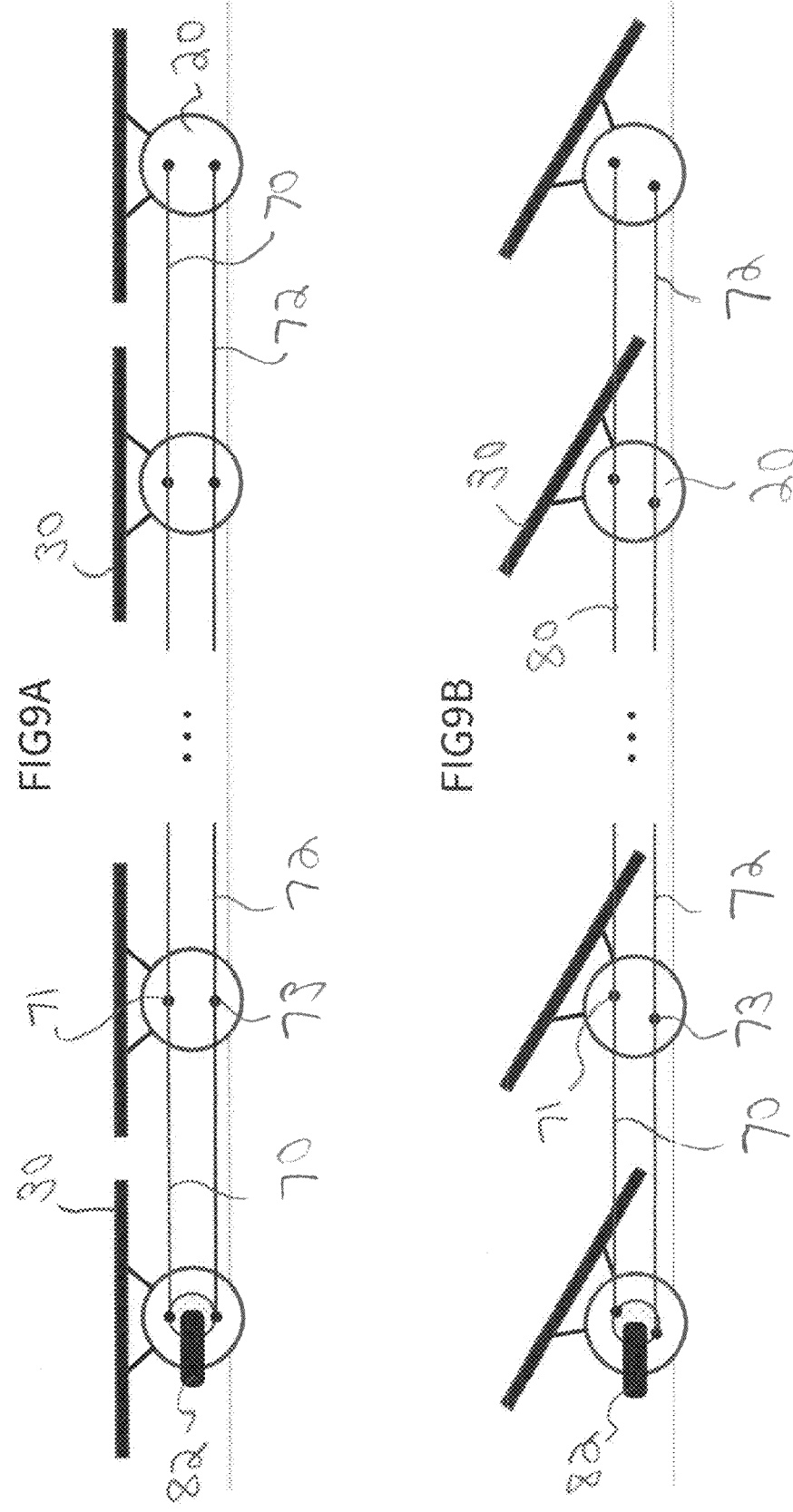

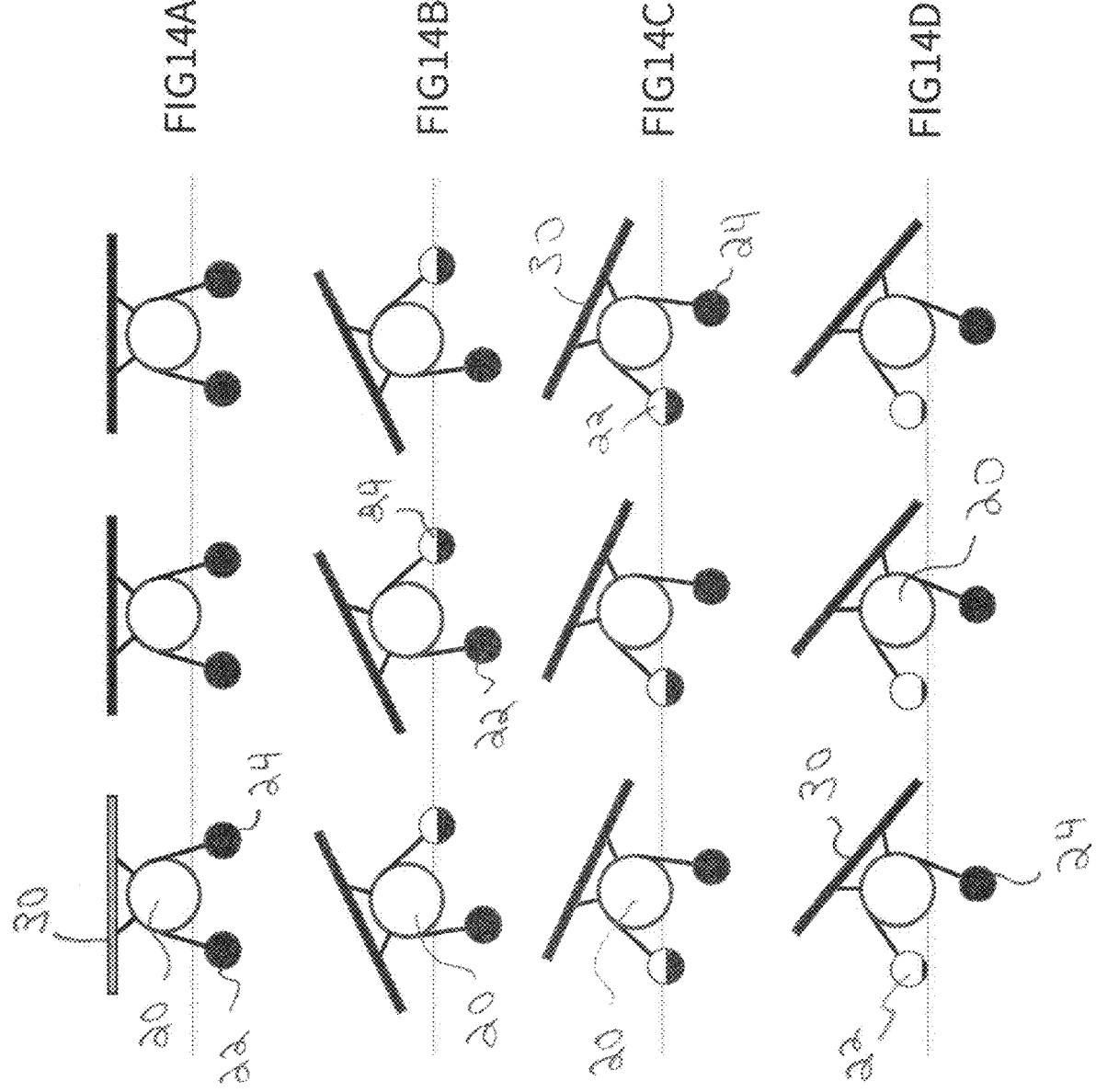

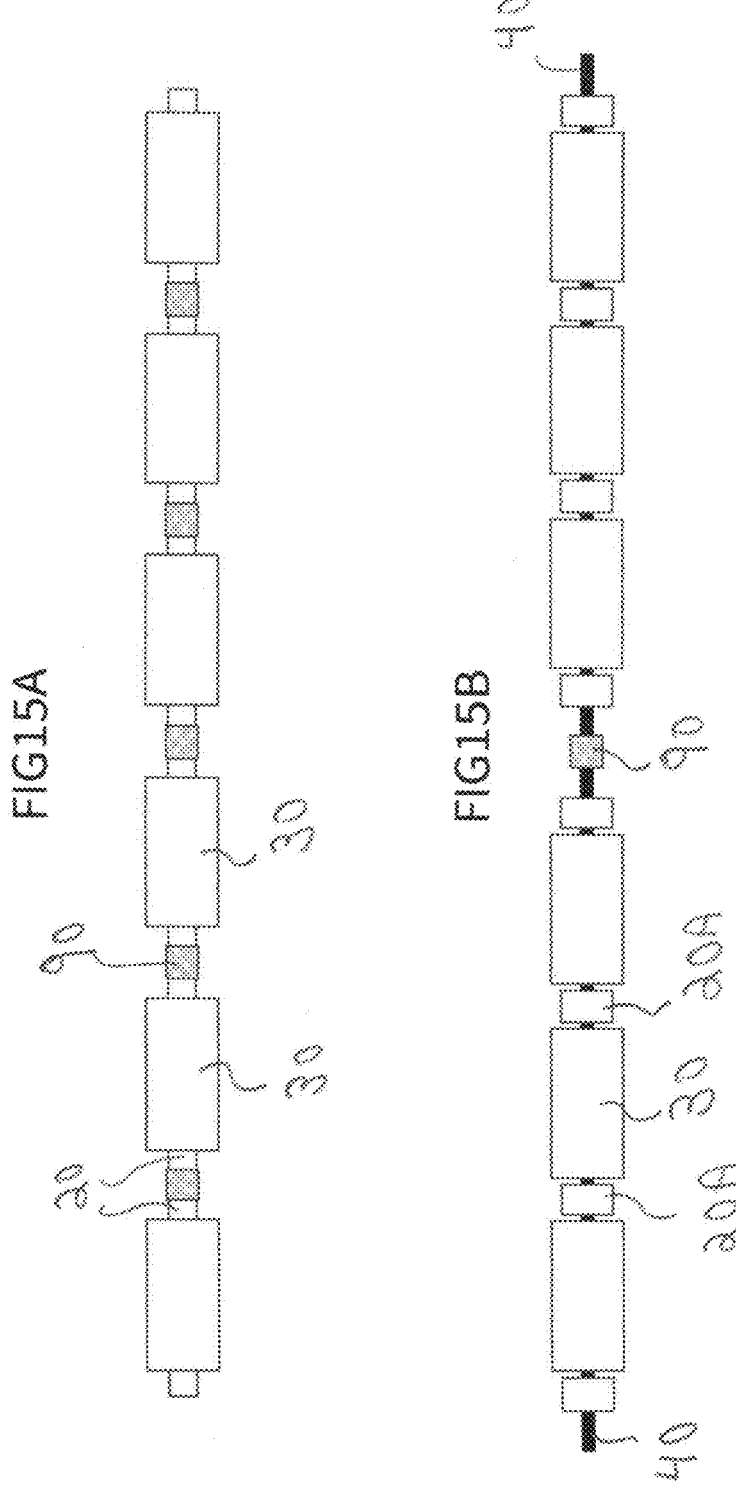

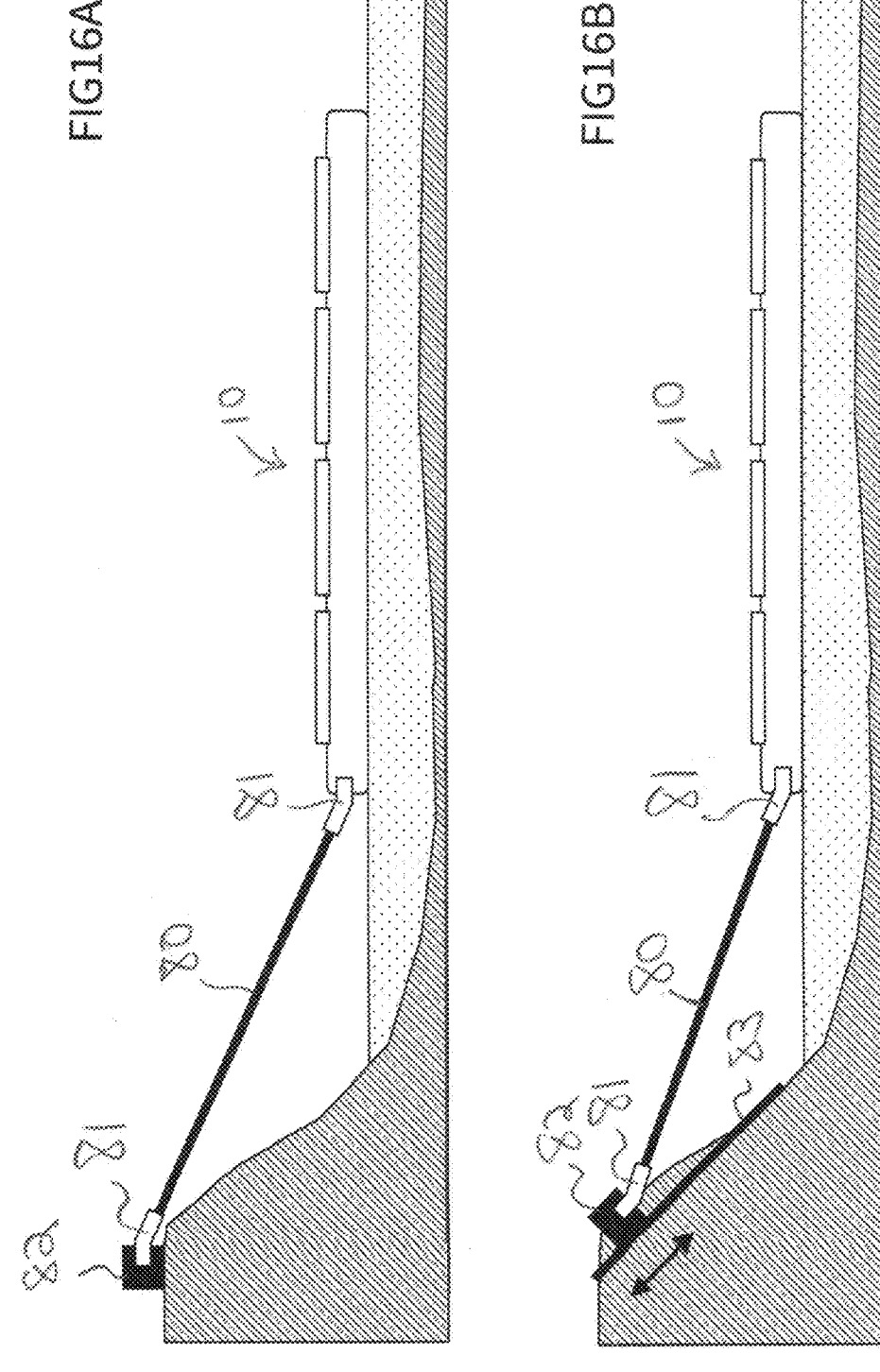

FLOATING TORQUE TUBE TRACKER ASSEMBLY

GOVERNMENT RIGHTS

This invention was made with government support under DE-SC0021714 awarded by the U.S. Department of Energy. The government has certain rights in the invention.

TECHNICAL FIELD

The present invention relates to floating solar photovoltaic (PV) arrays.

BACKGROUND OF THE INVENTION

Almost all (>99%) of the floating solar PV arrays currently installed around the world do not track the sun because of the lack of a cost-effective and technically viable solution. For existing floating solar PV arrays with solar tracking, the floats are separate structures from the tracking components (i.e.: the torque tubes). This type of separation is similar to the separation found in ground mounted systems in which the torque tubes are mounted onto piers in the ground.

It is generally desirable to provide a solar PV system in which the number of system components can be minimized. This is especially true in the case of floating solar PV arrays, since all of the components of floating systems must be moved to and assembled at the site and then installed on the water. In addition, previous systems' rigid, plastic floats were expensive to ship in volume. In the case of floating solar PV arrays, it would be desirable to provide a system in which components of the system operate to provide multiple functionalities. As will be shown, the present system meets this condition. For example, in preferred embodiments, the present system rotates its floats to function as torque tubes that position the solar PV modules to track the movement of the sun across the sky.

SUMMARY OF THE INVENTION

In preferred embodiments, the present system provides a floating solar PV assembly having cylindrical pontoons or floating torque tubes that can be used to vary the tilt of solar panels mounted on top. In optional embodiments, motors are used to drive the rotation of the cylindrical pontoons or floating torque tubes via direct drives, drive shafts, a hybrid configuration of direct drives and drive shafts, belt or chain drives, or coupling rods. In another optional embodiment, ballast tubes are used to achieve the rotation; and a tracker control system is also provided.

By using a cylindrical-shaped float or pontoon to both support the solar modules and act as their direction-pointing torque tube, the overall number of system parts is reduced. Simply put, the floats and the torque tube functions may be performed by only one device (i.e.: a rotating cylindrical-shaped float). An advantage of using one system component as both the system "float" and the system "torque tube" results in a minimal number of failure points, as well as a reduced shipping density.

Another advantage of the present system is that in one embodiment it has a small, packaged footprint since its pontoons can be deflated and flat-packed. This reduces shipping and project costs. Another advantage of the present system is that it follows the undulations of water bodies while also tracking the sun. This minimizes stress on the tracking components and improves the reliability of the system while ensuring that system energy production is maximized.

In one preferred embodiment, the torque tubes are floating cylinders. In another preferred embodiment, the torque tubes are more traditional torque tubes, being supported by cylindrical floating "donut" shaped floats. In yet another optional embodiment, the floats supporting the torque tubes may be rectangular. It is to be understood that the presently claimed invention encompasses all of these embodiments, without limitation.

For example, in one preferred embodiment, the present system provides a floating solar photovoltaic array torque tube tracker assembly, comprising: a plurality of cylindrical-shaped floats;

solar PV modules mounted on top of the plurality of cylindrical-shaped floats; and a rotation control system for rotating the cylindrical-shaped floats to tilt the solar PV modules in a direction to track movement of the sun.

In another preferred embodiment, the present system comprises a floating solar photovoltaic array torque tube tracker assembly, comprising:

a plurality of donut-shaped floats;

a plurality of torque tubes, wherein the torque tubes are supported by the donut-shaped floats;

solar PV modules mounted on top of the torque tubes; and a rotation control system for rotating either the donut-shaped floats or the torque tubes to tilt the solar PV modules in a direction to track movement of the sun.

In another preferred embodiment, the present system comprises a floating solar photovoltaic array torque tube tracker assembly, comprising:

a plurality of rectangular floats;

a plurality of torque tubes, wherein the torque tubes are supported by the rectangular floats;

solar PV modules mounted on top of the torque tubes; and a rotation control system for rotating the torque tubes to tilt the solar PV modules in a direction to track movement of the sun.

As is to be understood, the present invention therefore encompasses cylindrical-shaped, donut-shaped and even rectangular shaped floats. As a result, the present system more generally comprises a floating solar photovoltaic array torque tube tracker assembly, comprising:

a plurality of solar PV modules;

a plurality of torque tube assemblies; and a rotation control system for rotating the torque tube assemblies to tilt the solar PV modules in a direction to track movement of the sun, wherein each torque tube assembly comprises one of:

at least one cylindrical-shaped float with at least one solar PV module mounted thereon, wherein the cylindrical-shaped float is rotated to function as a torque tube by the rotation control system, or a torque tube with at least one solar PV module mounted thereon with at least one donut-shaped float supporting the torque tube, wherein the donut-shaped float or torque tube is rotated by the rotation control system, or a torque tube with at least one solar PV module mounted thereon with at least one rectangular float supporting the torque tube, wherein the torque tube is rotated by the rotation control system.

In its various embodiments, the present system may also comprise cylindrical-shaped, donut-shaped or other shaped floats that are inflatable membrane structures, or are made from a blow-molded, injection-molded, or extruded thermoplastic.

In various embodiments, the cylindrical-shaped floats may be full cylinders or half-cylinders.

In optional embodiments, the cylindrical-shaped floats may be connected together parallel to one another using an external frame or other connectors to form a multi-sided polygon. For example, an eight-cylinder polygon can be created with eight floats such that two of its floats are in the water and two of its floats are positioned adjacent to the solar PV module for mounting.

In optional embodiments, the rotation control system may be direct drive mechanisms connected to each row of cylindrical-shaped floats or torque tubes. In other optional embodiments, a drive shaft is used to connect and rotate multiple rows of cylindrical-shaped floats or torque tubes in unison. It is to be understood that the presently claimed invention encompasses all hybrid embodiments that combine direct drives and drive shafts to rotate multiple rows of floats or torque tubes in unison.

In other optional embodiments, a belt or chain drive wrapped around a sprocket on each row of the cylindrical-shaped floats, thus connecting the plurality of cylindrical-shaped float rows together such that they rotate in unison. In other optional embodiments, the rotation control system may be a pair of connecting rods connected to different locations on each of the cylindrical-shaped floats. Lateral movement of these connecting rods in opposite directions causes the cylindrical-shaped floats to rotate in unison. In other optional embodiments, ballast systems may be used to rotate the floats.

Other systems that may be included in the present system include onshore (or floating, or both onshore and floating) motor systems for rotating the cylindrical-shaped floats or torque tubes. Mooring lines may be used for positioning the assembly at a constant location in the body of water, as well as for connecting a plurality of torque tubes together. Spherical bearings, universal joints, beam couplings or flexible shaft couplings may be used to connect floats or torque tubes that are positioned together in line with one another. Optional spacing beams may be inserted between adjacent cylindrical-shaped floats or torque tubes to maintain the spacing between adjacent rows of cylindrical-shaped floats and provide structure to the overall array.

BRIEF DESCRIPTION OF THE DRAWINGS

FIG. 6A is a top plan view corresponding to one of the cylindrical-shaped floats of FIG. 1A.

FIG. 6B is a top plan view of a pair of solar PV modules supported by a single cylindrical-shaped float.

FIG. 6C is a top plan view of four or more solar PV modules supported by a single cylindrical-shaped float.

FIG. 7A is a top plan view similar to FIG. 4A, with a single solar PV module positioned in a landscape orientation on each torque tube.

FIG. 7B is a top plan view similar to FIG. 7A, but with a pair of solar PV modules positioned in landscape orientation on each torque tube.

FIG. 7C is a top plan view similar to FIG. 7A, but with the solar PV modules instead being positioned in a portrait orientation.

FIG. 9A is a side elevation view of an alternate system with connecting rods for rotating a pair of floats in unison.

FIG. 9B corresponds to FIG. 9A, but after the floats have been rotated to a second position.

FIGS. 14A to 14D illustrate tilting the solar PV modules by changing the amount of water in the ballast tubes.

FIG. 15A illustrates a system for connecting cylindrical-shaped floats together end-to-end.

FIG. 15B illustrates a system for connecting torque tubes together end-to-end.

FIG. 16A is a side elevation view of a flexible joint for connecting the cylindrical-shaped floats of the solar array to an onshore positioning motor via a direct drive system.

FIG. 16B is similar to FIG. 16A, but the positioning motor moves up and down on a rail structure to fluctuations in water level.

DETAILED DESCRIPTION OF THE DRAWINGS

Figures 1A, 1B:
FIG. 1A is a simplified perspective view of the present assembly in a first position, showing solar PV modules mounted on top of cylindrical-shaped floats.
FIG. 1B corresponds to FIG. 1A, after the cylindrical-shaped floats have been rotated to a second position, thereby tilting the solar PV modules to track movement of the sun.

FIGS. 1A and 1B illustrate a floating solar photovoltaic array torque tube tracker assembly 10 formed from cylindrical floats 20 with solar PV modules 30 mounted on top. FIG. 1A shows the floats 20 in a first position such that PV modules 30 point in a first direction, and FIG. 1B shows the floats 20 rotated to a second position such that PV modules 30 point in a second direction. In accordance with the present system, floats 20 are rotated in unison such that PV modules 30 point in a direction that tracks the movement of the sun across the sky during the day. As such, assembly 10 preferably comprises: a plurality of cylindrical-shaped floats 20; solar PV modules 30 mounted on top of the plurality of cylindrical-shaped floats 20; and a rotation control system (to be explained further herein) for rotating cylindrical-shaped floats 20 to continuously tilt solar PV modules 30 in a direction to track movement of the sun.

In preferred embodiments, cylindrical-shaped floats 20 are inflatable membrane structures. The advantage of being inflatable is that they can be deflated for shipping and storage (thereby significantly decreasing shipping and installation costs). Alternatively, however, cylindrical-shaped floats 20 may instead are made from a blow-molded, injection-molded, or extruded thermoplastic.

Figures 2A, 2B:
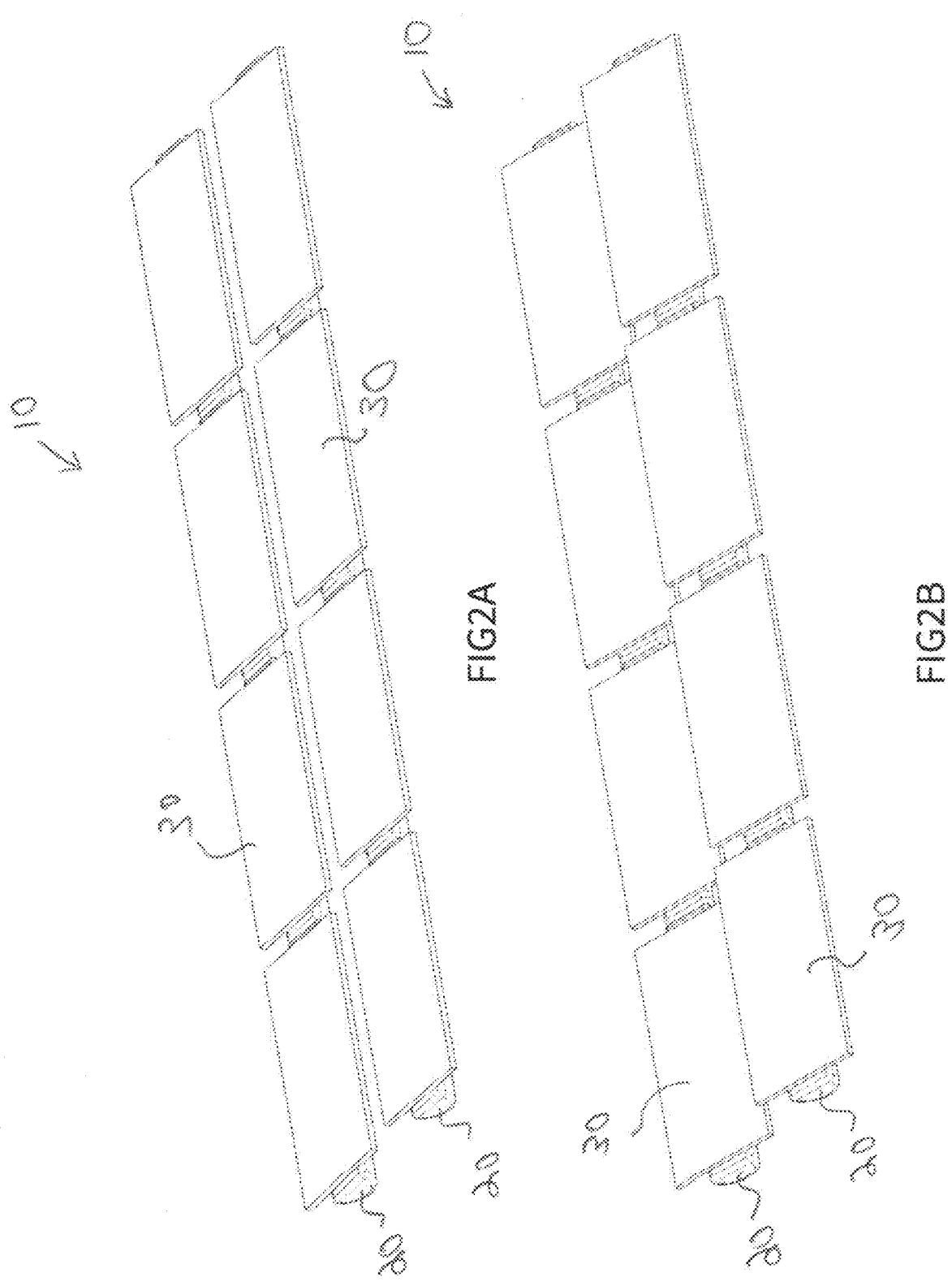
FIG. 2A is a simplified perspective view of a solar PV module mounted onto a half-cylinder float in a first position.
FIG. 2B corresponds to FIG. 2A, after the half cylinder-shaped float has been rotated to a second position, thereby tilting the solar PV module to track movement of the sun.

Next, FIGS. 2A and 2B show simplified views of solar PV modules 30 mounted onto half-cylinder floats 20 in a first position (FIG. 2A) and then rotated to a second position (FIG. 2B). It is to be understood that any reference to "cylindrical-shaped" herein refers to both full and half cylinders. Moreover, any reference to "cylindrical-shaped" herein may also refer to floats of any shape, having a curved surface which is able to rotate on the surface of the water, all keeping within the scope of the present invention. The advantage of this embodiment of float 20 is that it provides greater surface area onto which solar PV module 30 can be attached and reduces wind load by reducing exposed surface area on the backside of the panels.

Figures 3A, 3B:
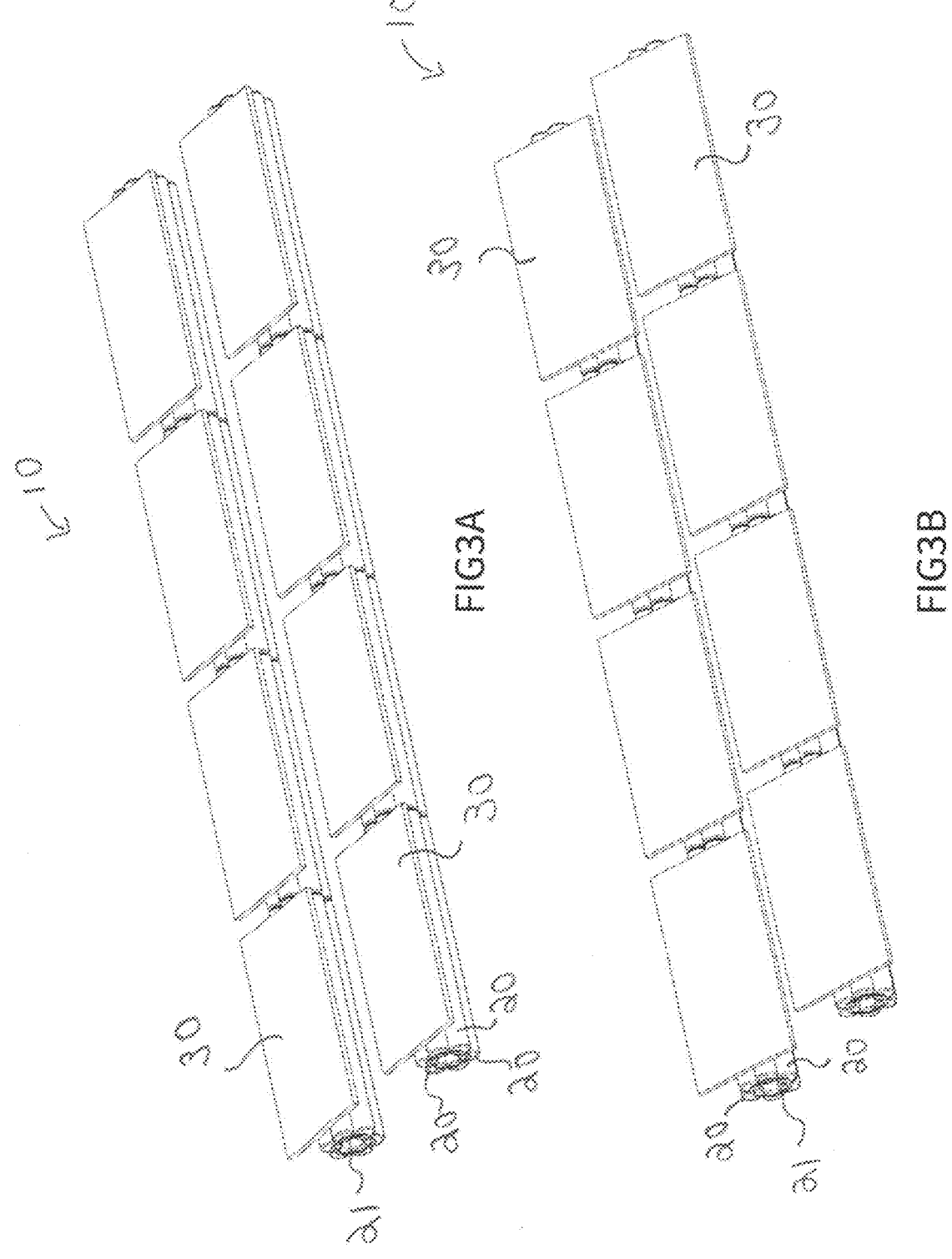
FIG. 3A is a simplified perspective view of a plurality of cylindrical-shaped floats being connected together into a six sided polygon, with a solar PV module mounted on top.
FIG. 3B corresponds to FIG. 3A, but is instead rotated to a second position, thereby tilting the solar PV module to track movement of the sun.

FIG. 3A is a simplified side elevation view of a plurality of cylindrical-shaped floats 20 being connected together by connection frame 21 into a six sided polygon, with a solar PV module 30 mounted on top. FIG. 3B corresponds to FIG. 3A, but is instead rotated to a second position. The advantage of this embodiment of the present system is that two or more floats 20 are in contact with the water and another two or more floats 20 are supporting solar PV module 30. This provides a more stable base for the PV array. In preferred embodiments, connection frame 21 can be made from any of metals, plastics, and reinforced plastics.

Figures 4A, 4B:
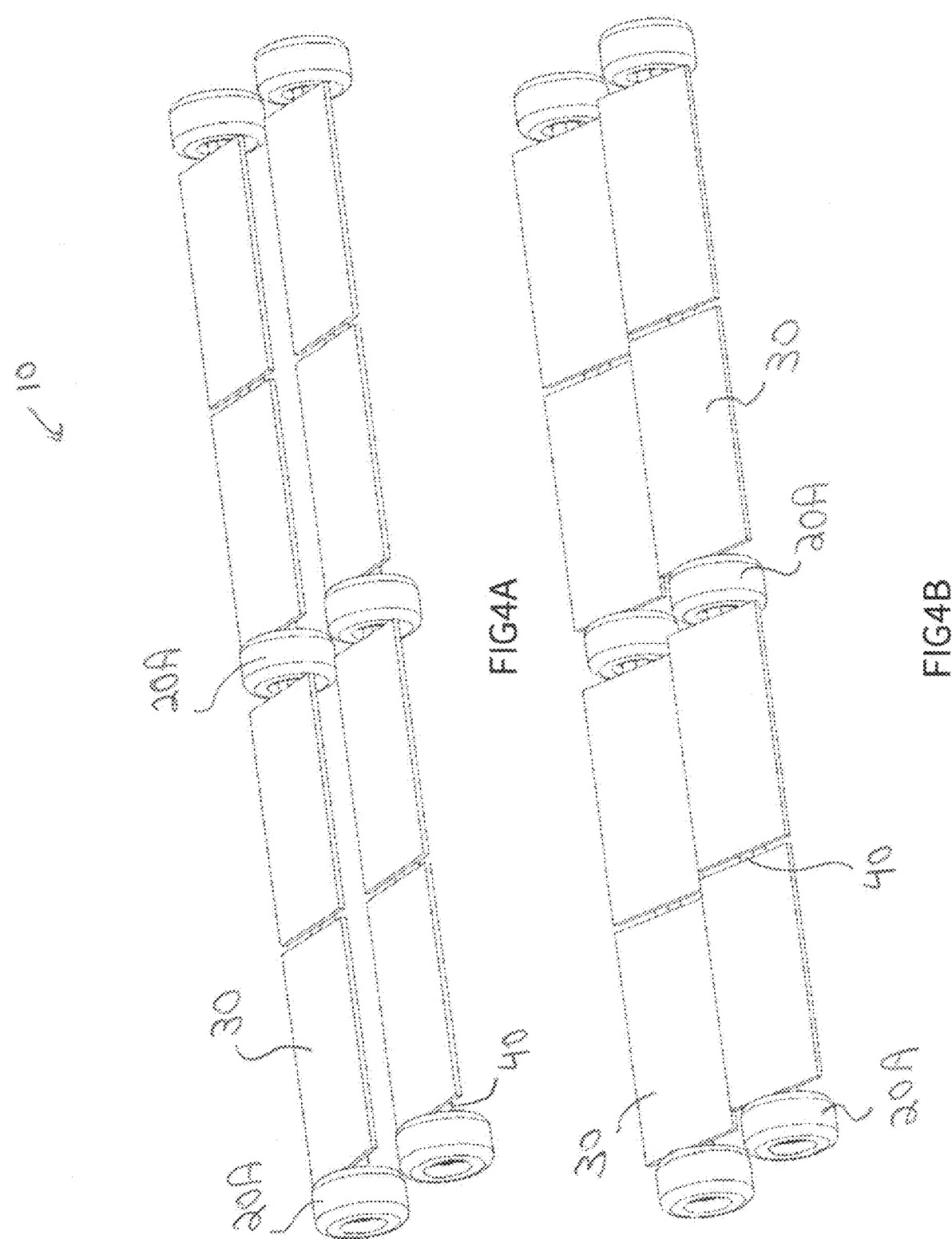
FIG. 4A is a simplified perspective view of the present assembly in a first position, showing solar PV modules mounted on top of donut-shaped floats, where a set of donut-shaped floats support a torque tube, with the torque tube supporting a solar PV module thereon.
FIG. 4B corresponds to FIG. 4A, after the donut-shaped floats or torque tube have been rotated to a second position, thereby tilting the solar PV modules to track movement of the sun.
Figure 4C:
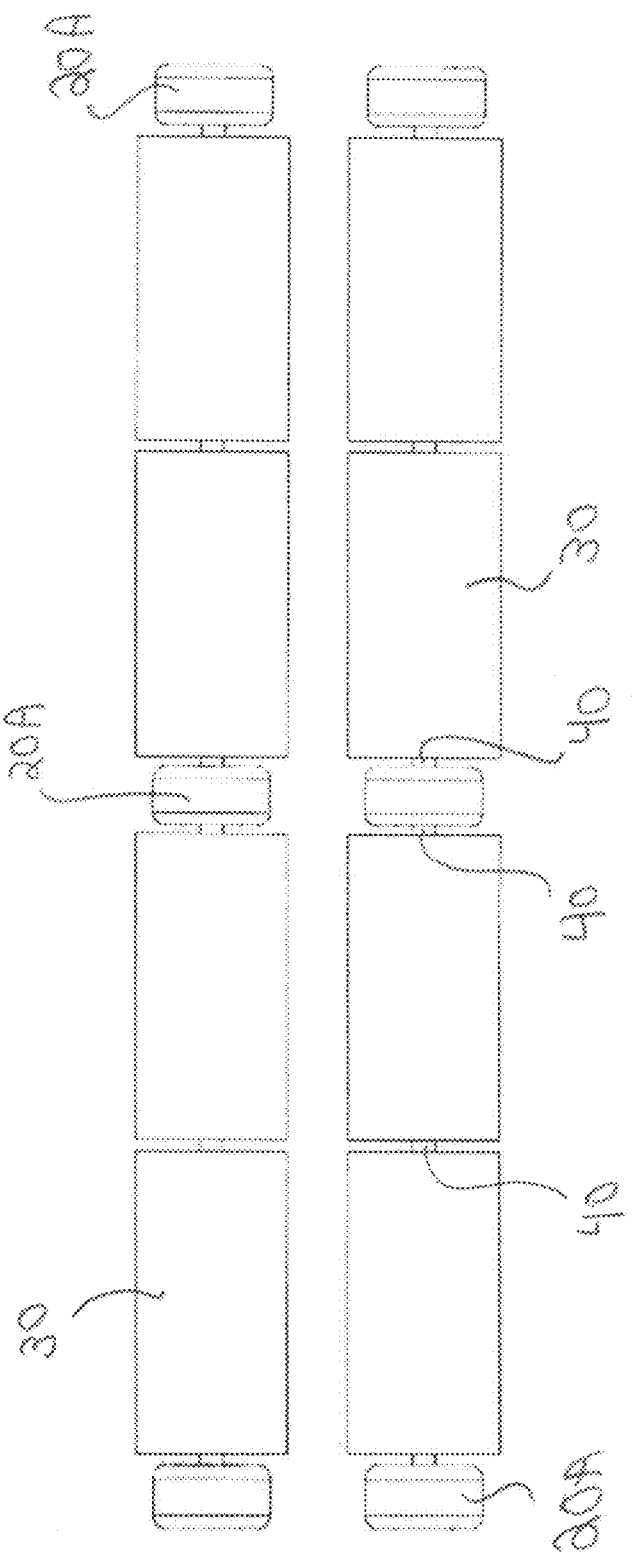
FIG. 4C is a top plan view corresponding to FIGS. 4A and 4B.

FIGS. 4A to 4C are simplified perspective and top views of an embodiment of the present system having a set of donut-shaped floats 20A that support a torque tube 40, with the torque tube supporting solar PV modules 30 thereon. Simply put, the donut-shaped floats 20A hold torque tube 40 out of the water. Rotation of donut-shaped floats 20A causes torque tube 40 to be rotated such that the direction that solar PV modules 30 point can be varied over the course of the day to track movement of the sun.

Figures 5A, 5B:
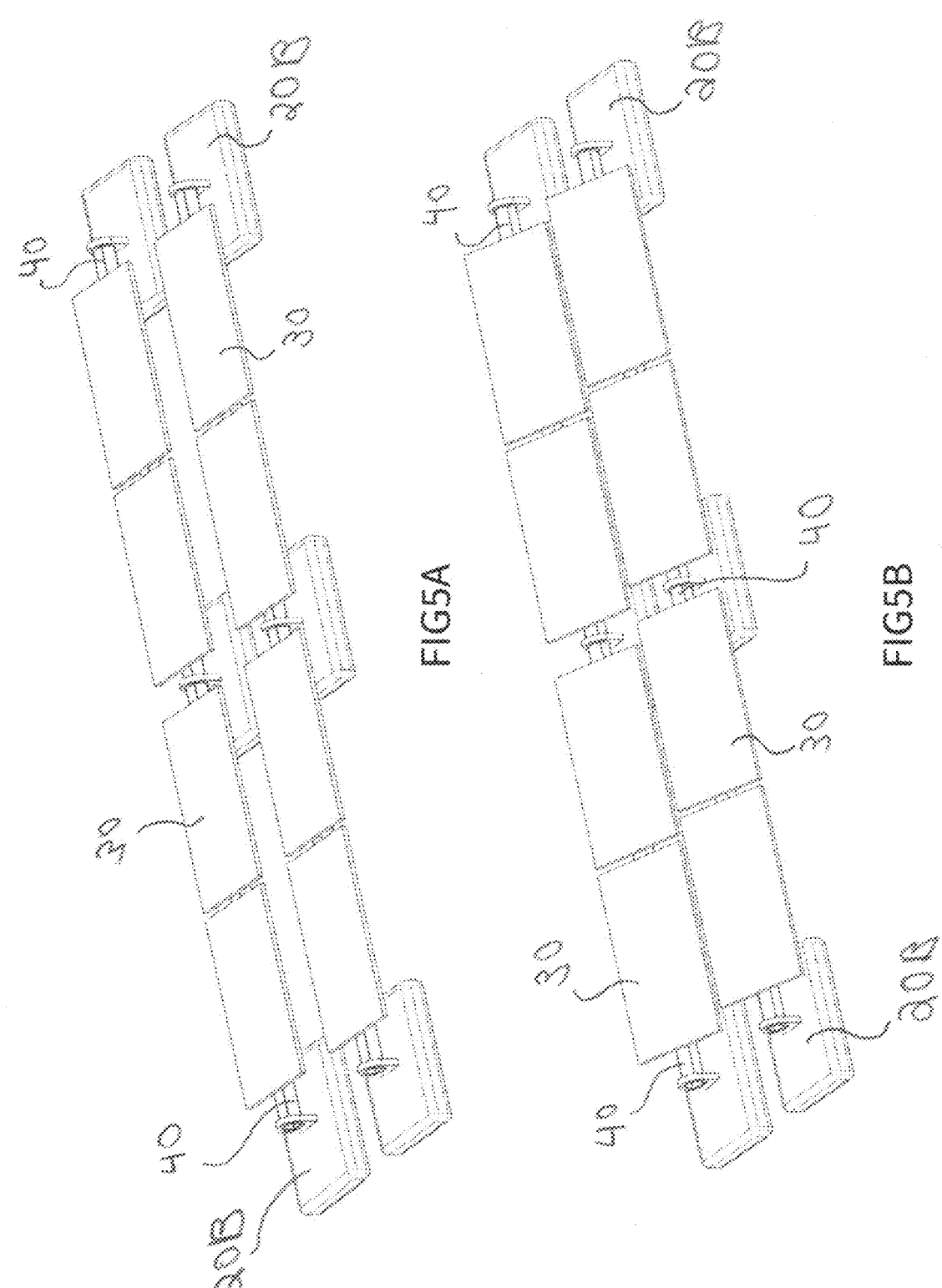
FIG. 5A is a is a simplified perspective view of the present assembly in a first position, showing solar PV modules mounted on top of rectangular-shaped floats, where the pair of rectangular-shaped floats support a torque tube, with the torque tube supporting a solar PV module thereon.
FIG. 5B corresponds to FIG. 5A, after the torque tube has been rotated to a second position, thereby tilting the solar PV modules to track movement of the sun.

Next, as seen in FIGS. 5A and 5B, rectangular floats 20B may also be used to support torque tubes 40 thereon. The rotation of torque tubes 40 causes the angle of solar PV modules 30 to change, thereby following the movement of the sun over the course of the day. In preferred embodiments, torque tubes 40 can be made of metals (such as steel or aluminum), plastic or even bamboo. Torque tubes 40 can have circular or polygon cross sections as desired. Solar PV modules 30 may be attached to torque tubes 40 by rails with clamps or fasteners that grab onto the frame of the solar PV module.

FIGS. 6A to 6C show that different numbers of solar PV modules 30 may be connected to each cylindrical-shaped float 20. For example, FIG. 6A shows one solar PV module connected to cylindrical-shaped float 20. FIG. 6B shows two solar PV modules connected to cylindrical-shaped float 20, and FIG. 6C shows four or more solar PV modules connected to cylindrical-shaped float 20.

FIGS. 7A to 7C show that the solar PV modules can also be attached in different orientations to a torque tube 40 (or alternately to a cylindrical-shaped float 20). In FIG. 7A, solar PV modules 30 are positioned one by one in a landscape orientation on a torque tube 40. In FIG. 7B, solar PV modules 30 are positioned two in landscape orientation along a torque tube 40. The advantage of FIG. 7B compared to FIG. 7A is that it increases the solar capacity per length of torque tube 40 FIG. 7C is similar to FIG. 7A, but with the solar PV modules 30 instead being positioned one in portrait orientation between donut-shaped floats 20A along a torque tube 40.

Figures 8A, 8B:
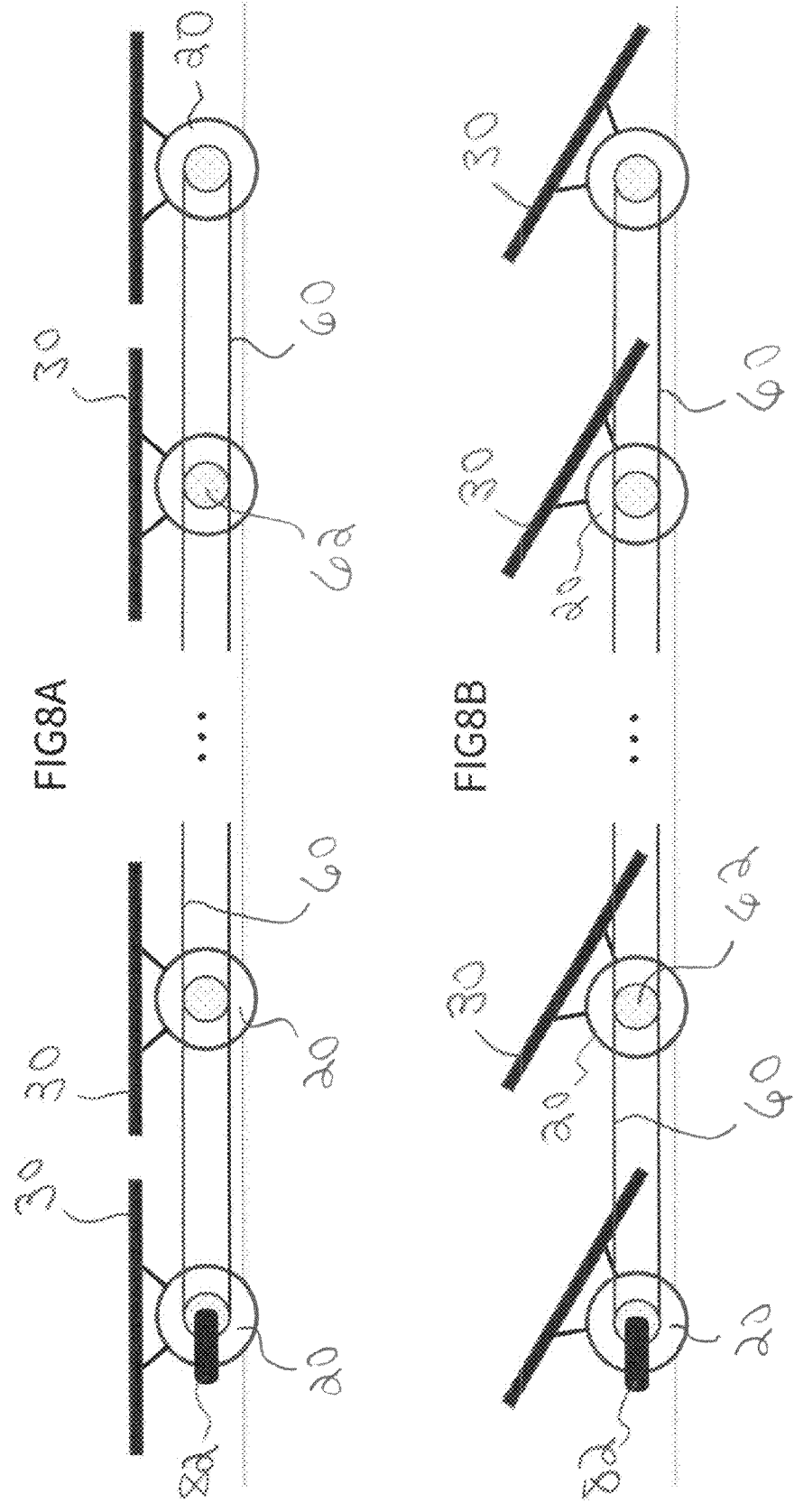
FIG. 8A is a view similar to FIG. 1A, but adding a belt drive and coupling sprockets to rotate the cylindrical-shaped floats in unison.
FIG. 8B corresponds to FIG. 8A after the solar PV modules have been rotated into a second position.

FIGS. 8A and 8B are similar to FIG. 1A, but adding a belt drive 60 and coupling sprockets 62 to rotate the cylindrical-shaped floats in unison. It is to be understood that the belt drive and sprockets may be made of any suitable material including plastics, reinforced plastics, metal chains, etc., all keeping within the scope of the present invention. The advantage of the present belt drive and sprocket rotation control system is that it rotates all of floats 20 together in unison (thereby keeping solar PV modules 30 all pointing in the same direction. A motor 82 may be used to rotate belt 60, thereby rotating all connected floats 20 together in unison. As will be shown, repeating units of this arrangement can be assembled together to successfully build a much larger floating solar PV array.

Next, FIGS. 9A and 9B illustrate an alternate rotation control system comprising a pair of connecting rods 70 and 72 connected to different locations (pins 71 and 73) on each of the cylindrical-shaped floats 20. As can be seen comparing FIGS. 9A and 9B, lateral movement of the connecting rods 70 and 72 in opposite directions causes rotation of the cylindrical-shaped floats 20 (and associated tilting of solar PV modules 30).

Figure 10:
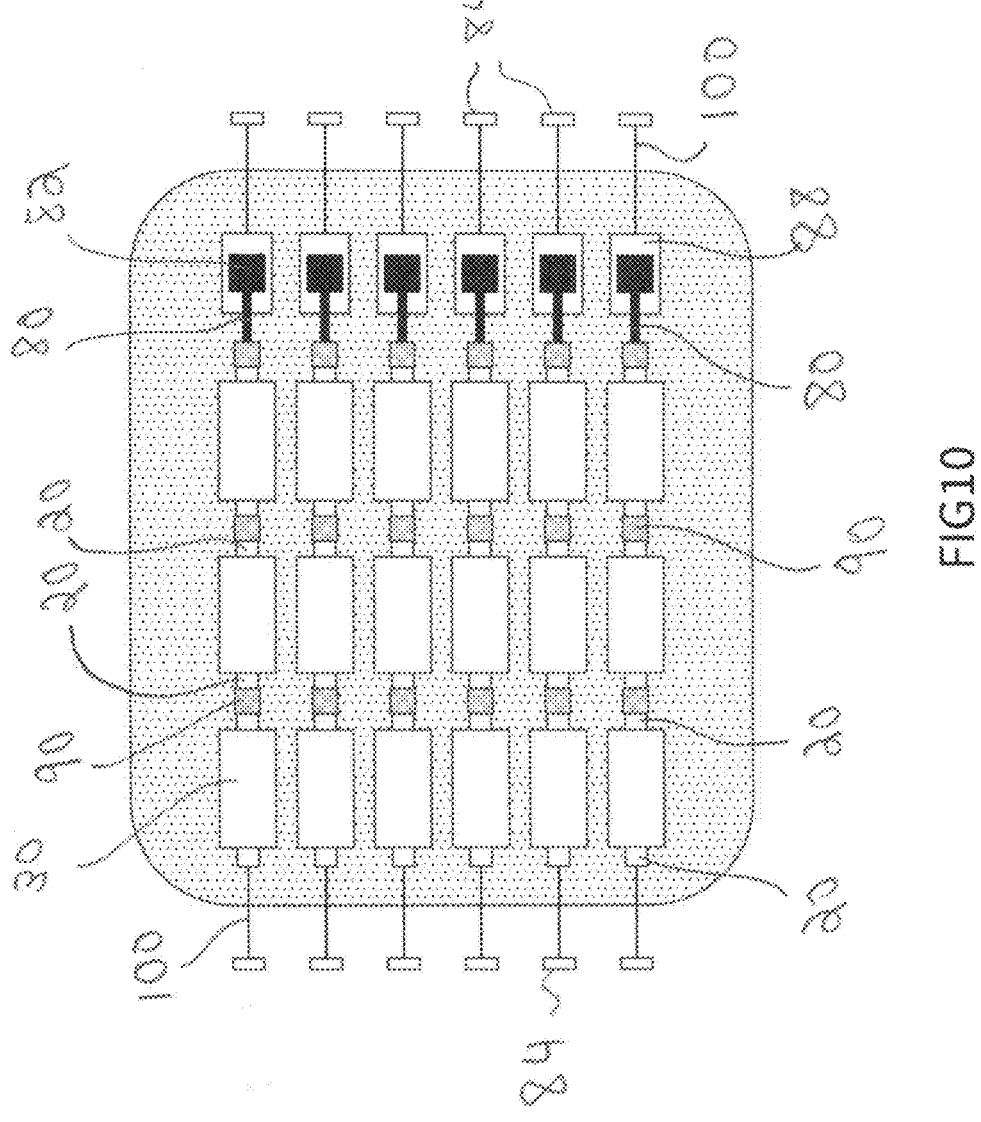
FIG. 10 is a top plan view of a floating solar PV array with floating motor systems and direct drive assemblies for rotating the floats.

Next, FIG. 10 illustrates an embodiment of the present system in which assembly 10 uses a direct drive motor system for rotating the floats. Specifically, a plurality of parallel, connecting shafts 80 are provided. Each connecting shaft 80 runs between the end of a row of floats 20 and a floating positioning motor 82 at one end of the assembly in a direct drive configuration. The positioning motors 82 may also rotate torque tubes 40 in the same direct drive configuration. In this embodiment, each positioning motor 82 rests on its own dedicated motor float 88. As illustrated, the array may cover a reservoir such that mooring lines 100 attached to the array are connected to shore piles or anchors 84 on opposite sides of a reservoir. Positioning motors 82 each rotate a row of floats 20. Connections 90 between floats 20 make all the floats 20 in a row rotate in unison.

Figure 11:
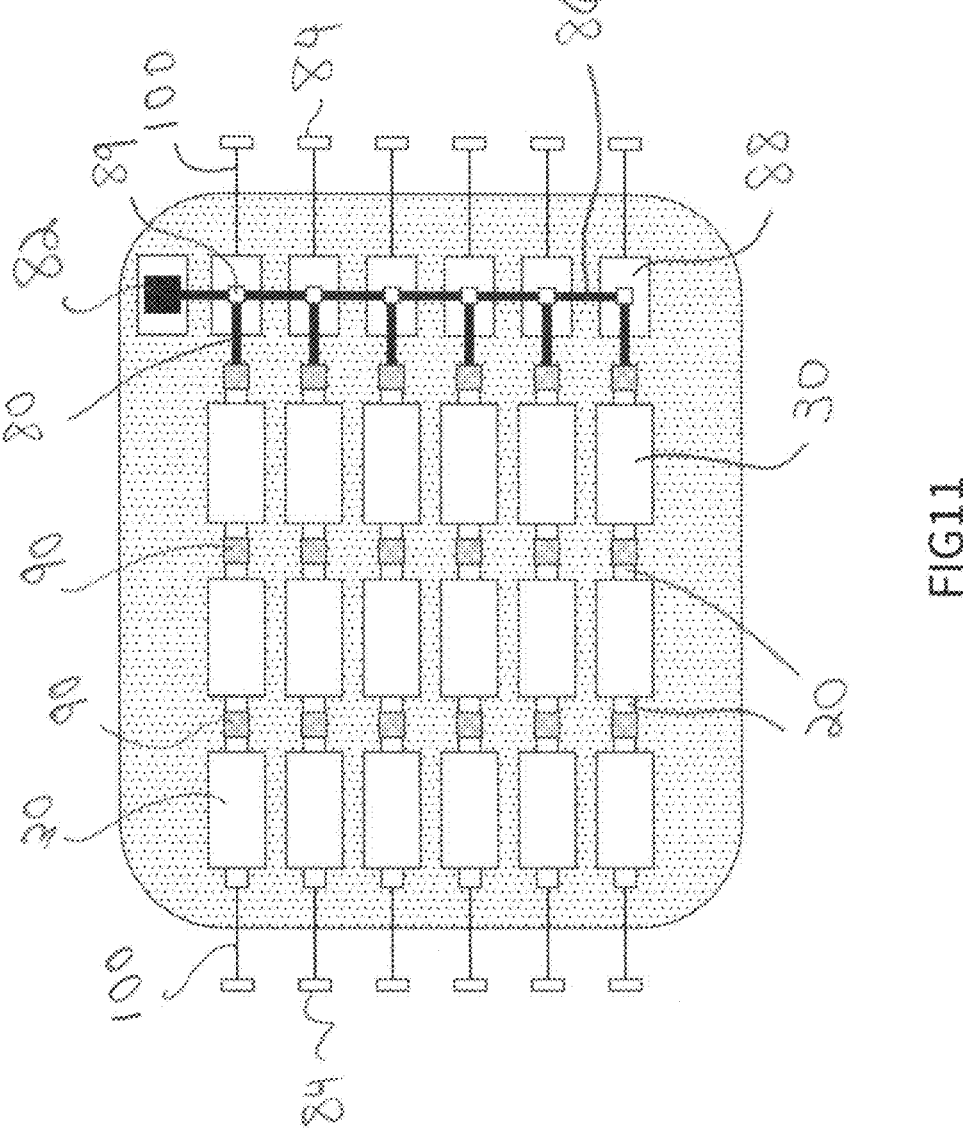
FIG. 11 is similar to FIG. 10, but instead reduces the number of positioning motors by use of a drive shaft, connector shafts and gear boxes to rotate the floats in unison.

Next, FIG. 11 illustrates another method for rotating multiple rows of floats in unison. In this embodiment, a drive shaft 86 is connected to multiple connecting shafts 80 via gear boxes 89. In this configuration, a single positioning motor 82 is able to simultaneously rotate multiple rows of floats 20 via the drive shaft 86. Drive shafts 86 may comprise any form of solid or hollow tube or belt or chain drive and may be made of metals, plastics or reinforced plastics. This embodiment reduces the number of positioning motors 82 needed to rotate multiple rows of floats 20 in unison.

Figure 12:
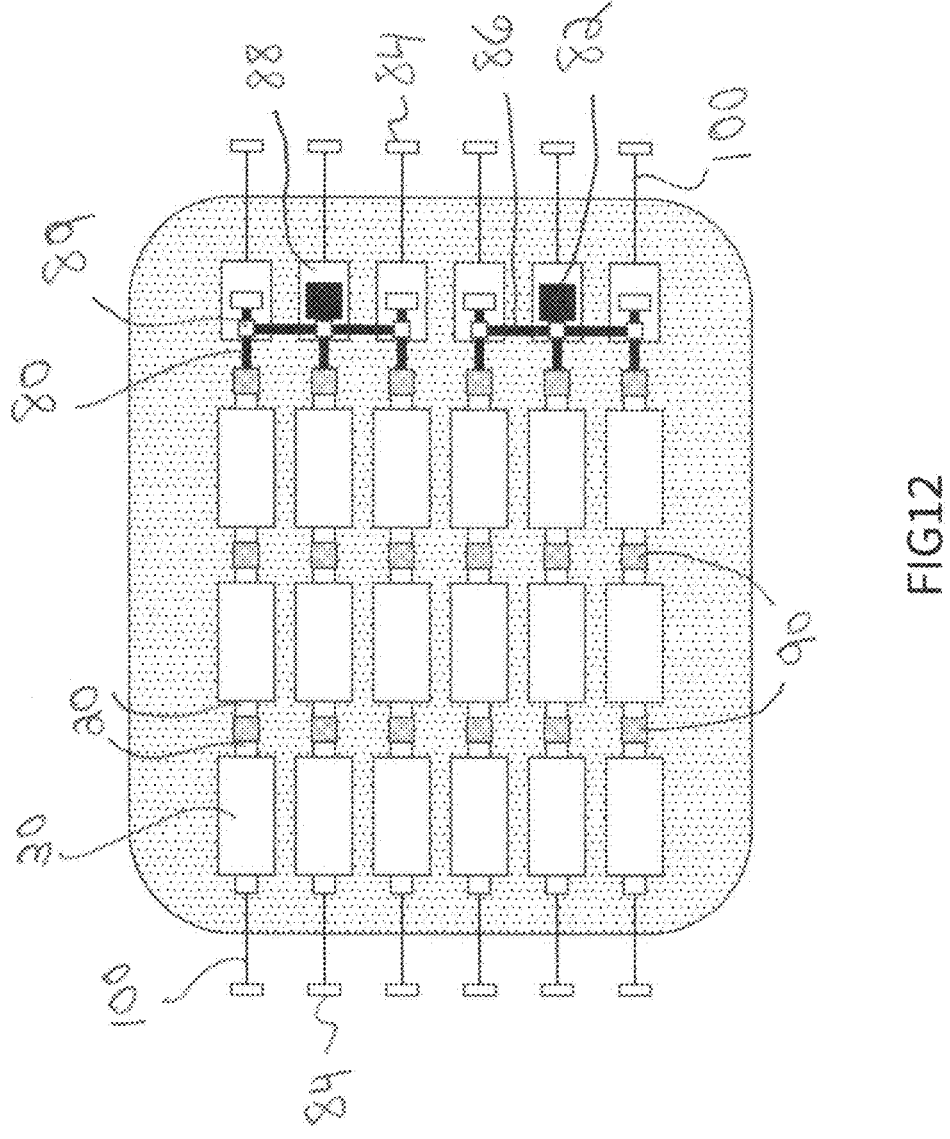
FIG. 12 is similar to FIG. 10 and FIG. 11, but uses a combination of direct drives and drive shafts for rotating the floats.

Next, FIG. 12 illustrates a hybrid system of FIG. 10 and FIG. 11 in which a floating positioning motor 82 rotates multiple rows of floats 20. In this embodiment, each positioning motors 82 is used to rotate one row of floats 20 in a direct drive configuration; however, there is also a drive shaft 86 associated with each positioning motor 82 that translates the rotation to adjacent rows of floats 20 via connecting shafts 80 and gear boxes 89. This embodiment uses more motors than that of FIG. 11, but it has the advantage of transmitting torque from the positioning motors 82 over shorter distances to rotate multiple rows of floats 20 in unison.

Figure 13:
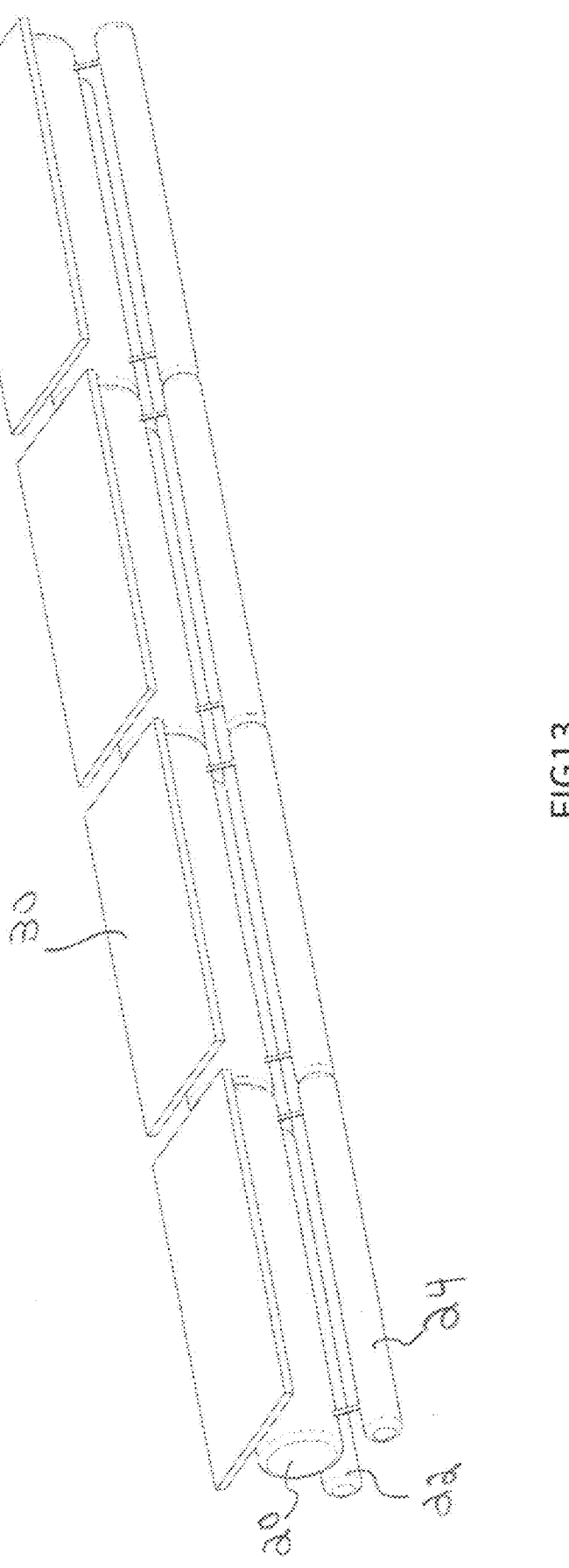
FIG. 13 illustrates solar PV mounted onto a series of cylindrical-shaped floats, with ballast tubes connected under the cylindrical-shaped floats.

Next, FIGS. 13 to 14D illustrate a system having ballast tubes 22 and 24 connected to the bottom of each cylindrical-shaped float 20. As seen in FIG. 14A, ballast tubes 22 and 24 may both be filled equally with water (thereby pointing solar PV modules 30 directly upwards. As seen in FIG. 14B, ballast tubes 22 may be filled with more water than ballast tubes 24 causing the array to tilt in one direction. As seen in FIG. 14C, ballast tubes 24 may instead be filled with more water than ballast tubes 22, thereby causing the array to tilt in the opposite direction. As can be seen by comparing FIGS. 14C and 14D, varying the amount of water used to partially fill one side of ballast tubes can be used to control the tilt angle of the solar PV modules 30.

As seen in FIGS. 15A and 15B, a variety of different systems may be provided for connecting torque tubes 40 (or cylindrical-shaped floats 20) together end-to-end. These connectors 90 include spherical bearings, universal joints, beam couplings or flexible shaft couplings. These systems may be combined and other systems may be used instead, all keeping within the scope of the present invention.

FIG. 16 illustrates side elevation views of a flexible joint 81 for connecting rows of floats 20 in the solar array to an onshore positioning motor 82 via a connecting shaft 80. In FIG. 16B, positioning motor 82 moves up and down on a rail 83. The flexible joints 81 in this embodiment accommodate changes in water level for systems where the positioning motors 82 are located onshore.

Figures 17A, 17B:
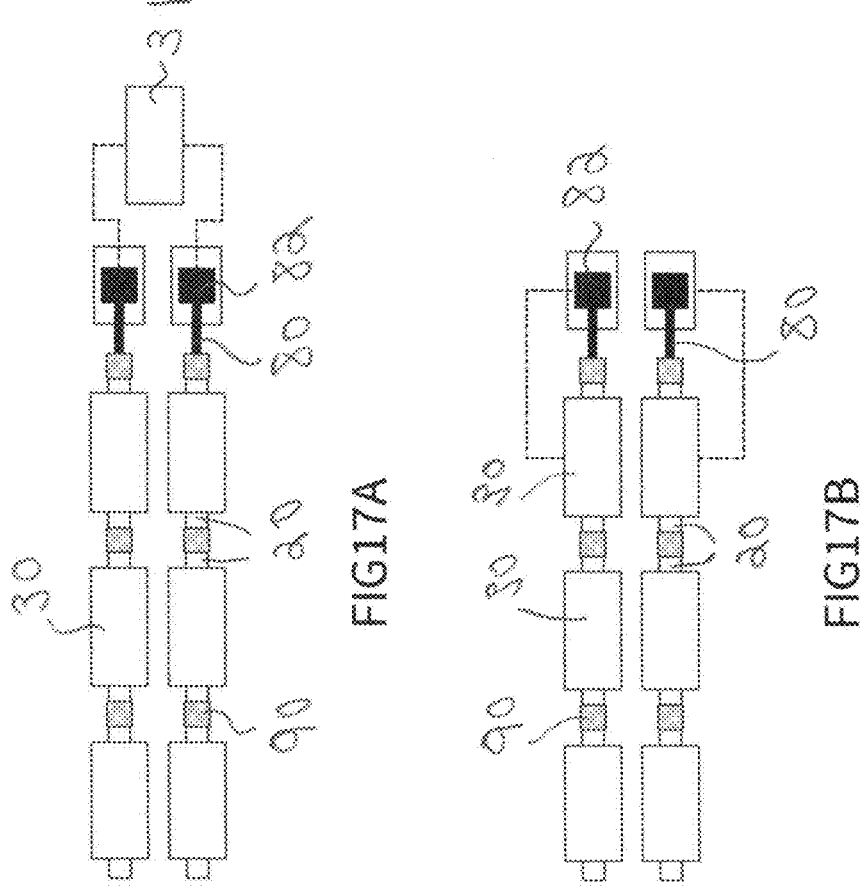
FIG. 17A is a top plan view of a floating array that uses positioning motors powered by a solar PV module separate from the main array.
FIG. 17B is a top plan view of a floating array that uses power from the main array of floating solar PV modules to power positioning motors.

The positioning motors 82 can be powered by its own dedicated solar PV modules 31 separate from the main array as in FIG. 17A or by one or a larger string of floating solar PV modules 30 of the main array as in FIG. 17B.

Figures 18, 19:
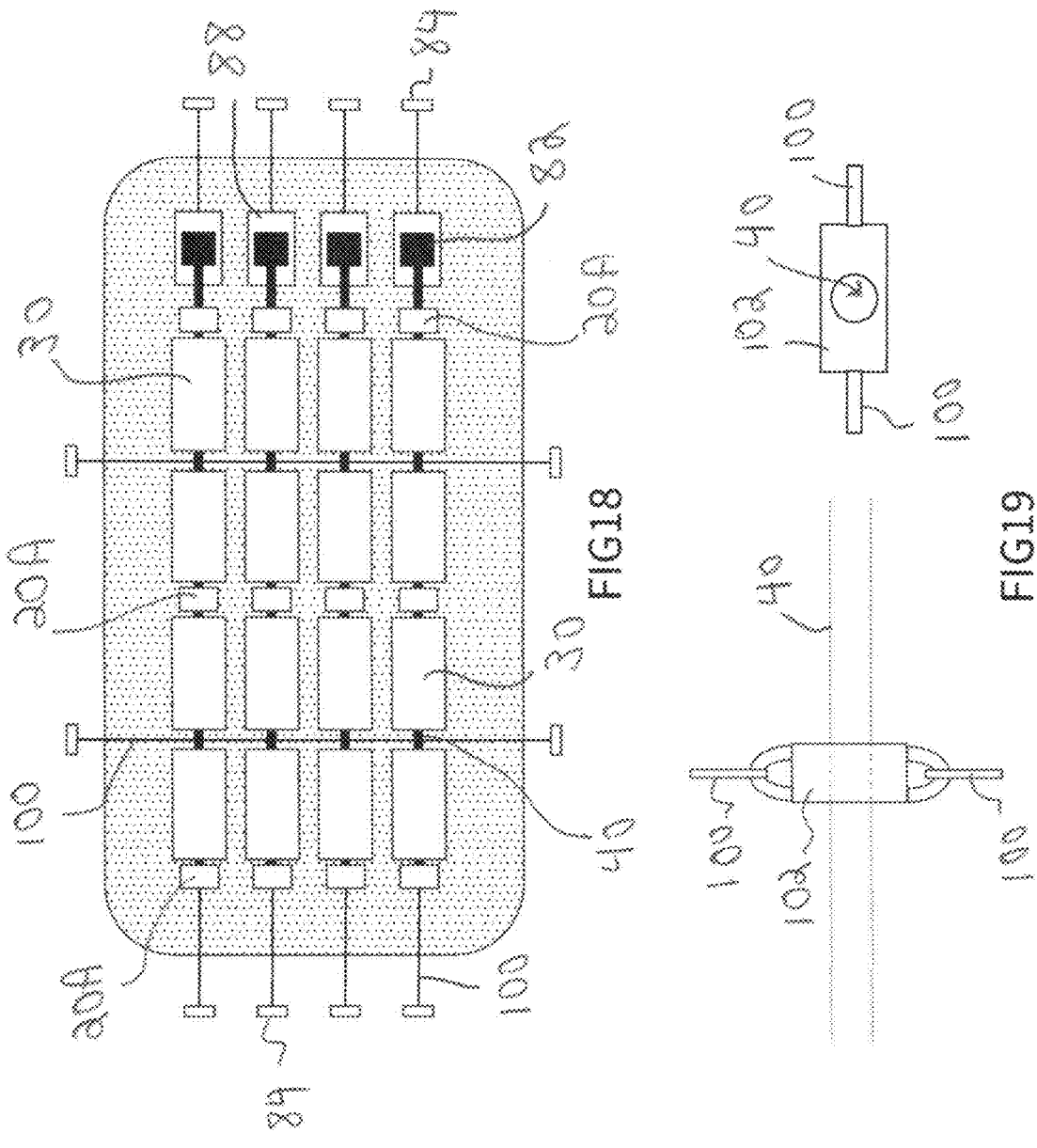
FIG. 18 is a top plan view of a floating solar PV array with parallel rows of torque tubes held in position by shore-to-shore mooring lines.
FIG. 19 is a close-up top plan view and side elevation view of a mooring line shackle connection to one of the torque tubes.

The present system also includes a number of different mooring and grid structures, as follows. For example, FIGS. 18 and 19 illustrate the use of mooring lines 100 passing across the assembly from one shore of the reservoir to the other. Mooring lines 100 extend in a direction perpendicular to torque tubes 40. In preferred embodiments, mooring lines 100 are connected to opposite sides of shackle 102, and torque tube 40 rotates within an opening passing through shackle 102. As illustrated, FIG. 18 uses rotating torque tubes 40 supported by donut-shaped floats 20A, whereas FIGS. 10 to 17B used rotating floats 20. It is to be understood that these embodiments are interchangeable and that the systems illustrated in FIGS. 10 to 22 may be used with either the cylindrical-shaped floats 20 embodiment, the rectangular floats 20B and torque tubes 40 embodiment, or the donut-shaped floats 20A and torque tubes 40 embodiment of the present system.

Figures 20, 21:
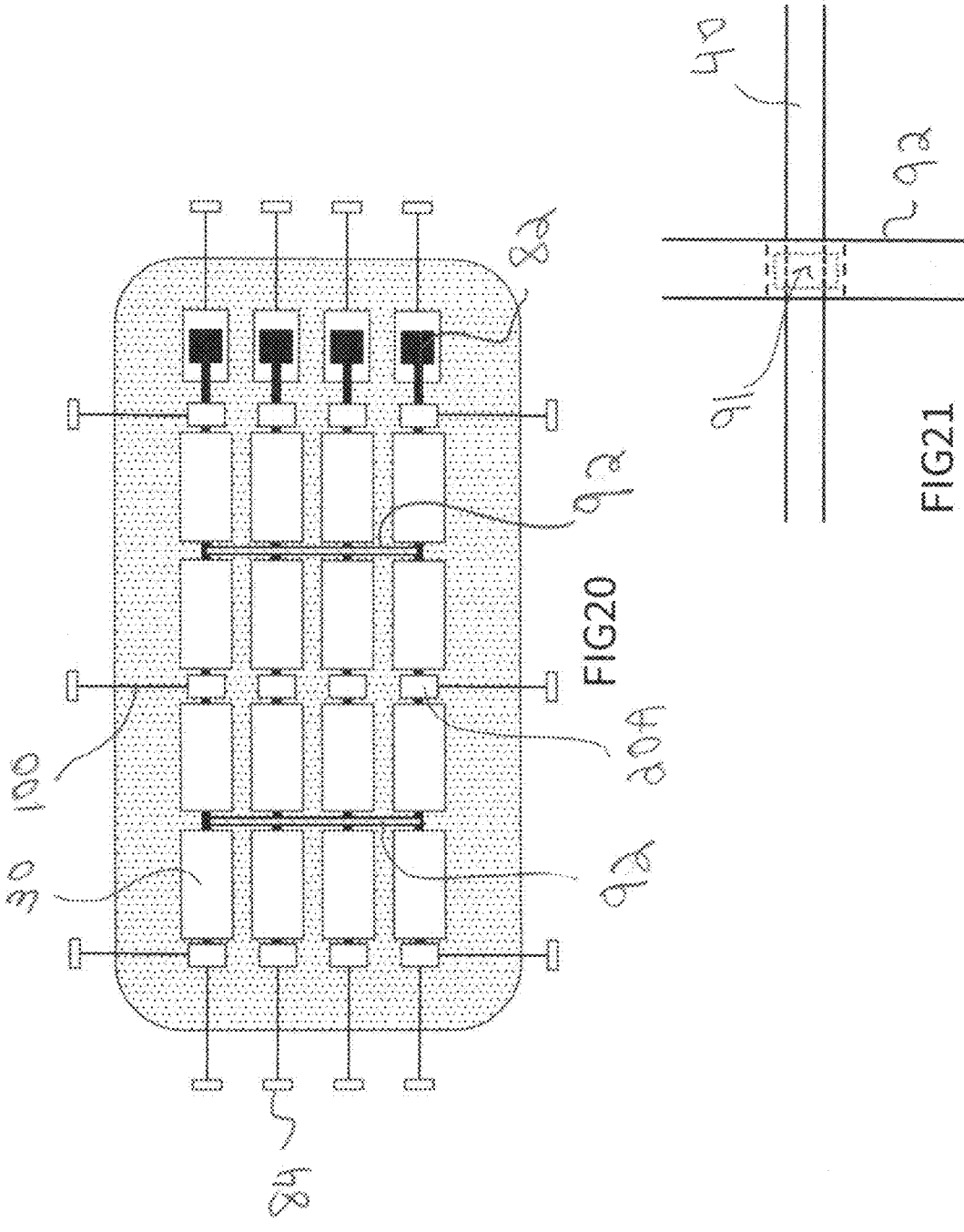
FIG. 20 is a top plan view of a floating solar PV array having structural beams connected to adjacent torque tubes, wherein the structural beams maintain the spacing between adjacent rows of torque tubes.
FIG. 21 is a close-up view of the connection between the structural beams and torque tubes in FIG. 20.

Next, FIGS. 20 and 21 illustrate a system in which structural beams 92 are used to separate and align successive rows of torque tubes 40, thereby keeping the entire array in alignment and providing structural stability. FIG. 21 shows an optional bearing 91 that permits each torque tube 40 to rotate in the openings passing through structural beams 92.

Figure 22:
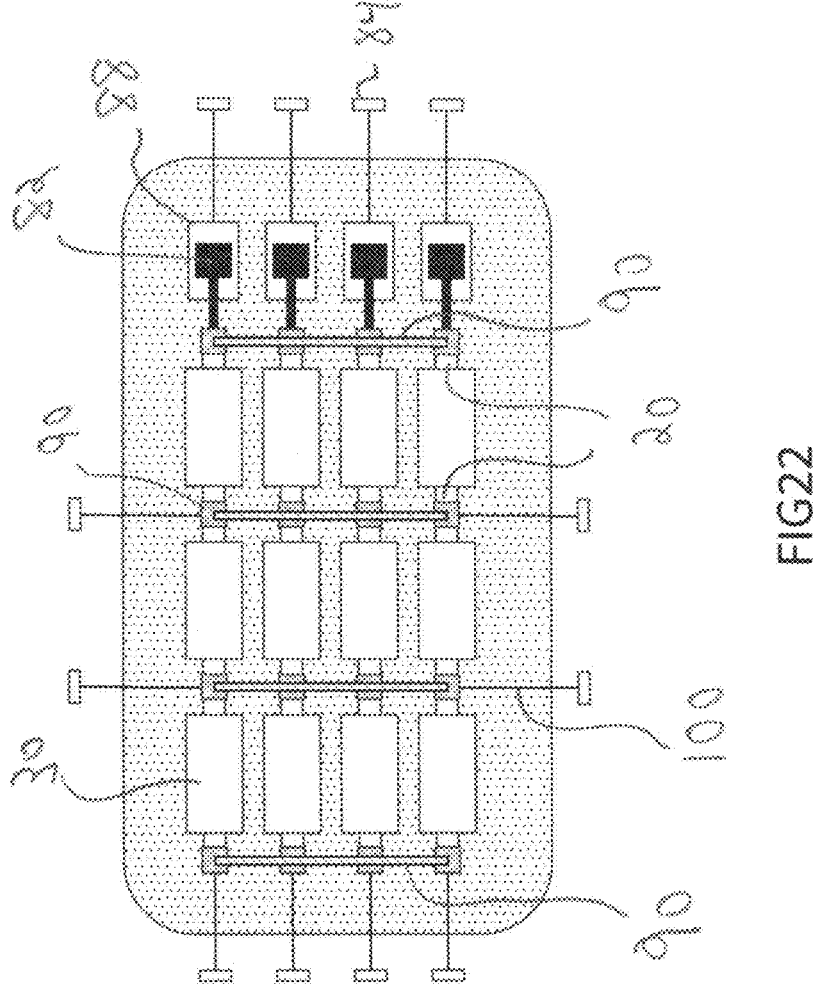
FIG. 22 is a top plan view of a floating solar PV array having structural beams connected to adjacent cylindrical-shaped floats, wherein the structural beams maintain the spacing between adjacent rows of floats.

FIG. 22 is similar to FIG. 21, but instead uses floats 20. It is to be understood that spacing systems between adjacent rows of solar PV modules 30 may be connected to cylindrical-shaped floats 20, donut-shaped floats 20A, rectangular shaped floats 20B, other shaped floats, torque tubes 40, or some combination thereof, all keeping within the scope of the present system.

What is claimed is:

1. A floating solar photovoltaic array torque tube tracker assembly, comprising:
   a plurality of sealed cylindrical-shaped floats;
   solar PV modules mounted on top of the plurality of cylindrical-shaped floats wherein each of the solar PV modules rotates together with one of the cylindrical-shaped floats; and
   a rotation control system for rotating the cylindrical-shaped floats to tilt the solar PV modules in a direction to track movement of the sun, and
   wherein no water enters or leaves each of the cylindrical-shaped floats as the cylindrical-shaped floats rotate.

2. The assembly of claim 1, wherein the sealed cylindrical-shaped floats are inflatable membrane structures or made from a blow-molded, injection-molded, or extruded thermoplastic.

3. The assembly of claim 1, wherein the cylindrical-shaped floats are half-cylinders.

4. The assembly of claim 1, wherein a plurality of solar PV modules are connected to each cylindrical-shaped float.

5. The assembly of claim 1, wherein the rotation control system comprises a positioning motor and shaft that connects to a row of cylindrical-shaped floats in a direct drive configuration, and wherein the motor is used to rotate the row of cylindrical-shaped floats.

6. The assembly of claim 1, wherein the rotation control system comprises a positioning motor, a drive shaft, and a plurality of gear boxes and shafts that connect to multiple rows of cylindrical-shaped floats, and wherein the motor is used to rotate multiple rows of cylindrical-shaped floats in unison.

7. The assembly of claim 6, wherein the rotation control system directly drives rotation of one row of cylindrical-shaped floats and uses a drive shaft and gear boxes to rotate adjacent rows of cylindrical-shaped floats in unison.

8. The assembly of claim 1, wherein the rotation control system comprises a belt or chain drive connecting the plurality of cylindrical-shaped floats together, and wherein the cylindrical-shaped floats rotate together when the belt is rotated.

9. The assembly of claim 1, wherein the rotation control system comprises a pair of connecting rods connected to different locations on each of the cylindrical-shaped floats, and wherein lateral movement of the connecting rods in opposite directions causes rotation of the cylindrical-shaped floats.

10. The assembly of claim 1, further comprising:

an onshore positioning system for rotating the cylindrical-shaped floats; and a floating positioning system for rotating the cylindrical-shaped floats.

11. The assembly of claim 1, wherein the plurality of floats are connected together inline by one of spherical bearings, universal joints, beam couplings, or flexible shaft couplings.

12. The assembly of claim 1, further comprising:

mooring lines for positioning the assembly at a constant location in the body of water.

13. The assembly of claim 1, further comprising:

spacing beams between adjacent cylindrical-shaped floats to maintain the spacing between adjacent rows of cylindrical-shaped floats; and mooring lines and shackles between adjacent cylindrical-shaped floats to maintain the spacing between adjacent rows of cylindrical-shaped floats.

\* \* \* \* \*